US008158231B2

(12) United States Patent
Hopkins et al.

(10) Patent No.: US 8,158,231 B2

(45) Date of Patent: Apr. 17, 2012

(54) SELF-ADHESIVE RADIANT HEATING UNDERLAYMENT

(75) Inventors: John R. Hopkins, Bow Mar, CO (US); Timothy Roger Schettler, Castle Rock, CO (US)

(73) Assignee: Protecto Wrap Company, Denver, CO (US)

( * ) Notice: Subject to any disclaimer, the term of this patent is extended or adjusted under 35 U.S.C. 154(b) by 286 days.

(21) Appl. No.: 12/684,777

(22) Filed: Jan. 8, 2010

(65) Prior Publication Data

US 2010/0175824 A1 Jul. 15, 2010

Related U.S. Application Data

(60) Provisional application No. 61/143,699, filed on Jan. 9, 2009.

(51) Int. Cl.

*B32B 9/00* (2006.01)
*B32B 33/00* (2006.01)
*H05B 3/00* (2006.01)
*H05B 3/34* (2006.01)

(52) U.S. Cl. ...... 428/40.1; 428/40.9; 219/200; 219/213; 219/528; 219/548

(58) Field of Classification Search ................. 428/40.1, 428/40.9; 219/200, 213, 528, 548
See application file for complete search history.

(56) References Cited

U.S. PATENT DOCUMENTS

| | | | | |
|---|---|---|---|---|
| 2,368,689 | A | 2/1945 | Thomas | |
| 3,417,229 | A * | 12/1968 | Shomphe et al. | 219/528 |
| 4,509,999 | A | 4/1985 | Sandor | |
| 4,776,141 | A | 10/1988 | Powell | |
| 4,832,090 | A | 5/1989 | Krenkel et al. | |
| 5,027,572 | A | 7/1991 | Purcell et al. | |
| 5,046,479 | A | 9/1991 | Usui | |
| 5,218,793 | A | 6/1993 | Ball | |
| 5,662,624 | A | 9/1997 | Sundstrom | |
| 5,899,026 | A | 5/1999 | Williams et al. | |
| 5,961,869 | A | 10/1999 | Irgens | |
| 6,098,343 | A | 8/2000 | Brown et al. | |
| 6,305,130 | B1 | 10/2001 | Ackerman, Jr. | |
| 6,401,401 | B1 | 6/2002 | Williams | |
| 6,401,402 | B1 | 6/2002 | Williams | |
| 6,479,117 | B1 | 11/2002 | Phillips et al. | |
| 6,546,679 | B1 | 4/2003 | Bushberger | |
| 6,725,610 | B2 | 4/2004 | Murphy et al. | |
| 7,022,631 | B2 | 4/2006 | Schmid | |

(Continued)

FOREIGN PATENT DOCUMENTS

GB 2433186 A 6/2007

OTHER PUBLICATIONS

Calorique, Ltd. Technical Information Sheet, 1999.

(Continued)

*Primary Examiner* — Patricia Nordmeyer

(74) *Attorney, Agent, or Firm* — Marsh Fischmann & Breyfogle LLP

(57) ABSTRACT

Provided herein is a self-adhesive radiant heat underlayment that may be utilized in flooring and/or outdoor applications. The heating underlayment has an adhesive backing that allows for conveniently adhering a flexible heating element place prior to applying a material over the top surface thereof. In one arrangement, a mesh grounding layer is provided to ground the flexible heating element to reduce unintended electrical tripping of the installed underlayment.

25 Claims, 9 Drawing Sheets

U.S. PATENT DOCUMENTS

| | | | |
|---|---|---|---|
| 7,341,789 | B2 | 3/2008 | Saitoh |
| 7,488,523 | B1 | 2/2009 | Muncaster et al. |
| 8,039,774 | B2 * | 10/2011 | Dubey .......................... 219/213 |
| 2003/0124292 | A1 | 7/2003 | Unterreiter |
| 2003/0178121 | A1 | 9/2003 | Hopkins et al. |
| 2005/0011140 | A1 | 1/2005 | Ackerman, Jr. et al. |
| 2005/0144865 | A1 | 7/2005 | Ellingson |
| 2005/0158503 | A1 * | 7/2005 | O'Connor .................... 428/40.1 |
| 2006/0101726 | A1 | 5/2006 | Collins |

OTHER PUBLICATIONS

Carlisle Coatings & Waterproofing, Inc., Product Installation Instructions, 2004.

Easy Heat(R) Warm Tiles(R) literature. Copyright 2007. Self adhesive underfloor heater for use in tile applications.

PWC Anti-Fracture Membrane literature. Copyright 2007. Bitumen anti-fracture membrane with fabric bonding surface.

* cited by examiner

SELF-ADHESIVE RADIANT HEATING UNDERLAYMENT

CROSS-REFERENCE TO RELATED APPLICATION

This application claims the benefit of the filing date under 35 U.S.C. 119 to U.S. Provisional Application No. 61/143,699, entitled, "SELF-ADHESIVE RADIANT HEATING UNDERLAYMENT," filed on Jan. 9, 2008, the contents of which are incorporated herein as if set forth in full.

FIELD

The present disclosure relates broadly to heated underlayments. More particularly, aspects of the disclosure relate to a self-adhesive radiant heating underlayment that may also provide electrical grounding, a moisture barrier, sound deadening, crack suppression and/or insulation.

BACKGROUND

Radiant in-floor heating systems typically utilize hot fluids circulating through tubes (hydronic systems) or electric current through cables (electrical resistance systems) installed in concrete slabs or attached to a subfloor and covered with a pourable floor underlayment. Hot fluids circulating through the tubes or electrical resistance in the cables warm the underlayment and the floor covering above.

These hydronic and electrical resistance systems, however, have the disadvantages of high capital and installation costs as well as the difficulty and high cost involved in maintenance and repair. For instance, electrical resistance systems typically include a plurality of heating cables disposed along a serpentine path and spaced above the top surface of the subfloor. Such paths are customized based on the layout of the floor for which heating is desired. Once the cable is installed, cementitious slurry is then poured over the sub-floor to embed the resistance heating cable into the cement layer. In both cases, the heating elements are typically encased in a cement or gypsum slab. Once so encased, flooring is applied over the slab. Such systems significantly increase the time and labor required for construction.

To address the such shortcomings, efforts have been made to provide pre-assembled mats that incorporate electrical resistors (heating elements). Multiple such mats may be laid out to cover a floor or subfloor and interconnected (e.g., electrically connected). These mats are then secured to the floor or subfloor and may then be covered with cement/gypsum, tile and/or other flooring materials.

SUMMARY

Provided herein is a self-adhesive radiant heat underlayment that may be utilized in flooring and/or outdoor applications. The heating underlayment has an adhesive backing that allows for conveniently adhering a flexible heating element in place prior to applying a material over the top surface thereof. In one arrangement, the underlayment is utilized in flooring applications where it is desirable to lay tile. In another arrangement, the underlayment is utilized in outdoor applications such as a roofing underlayment or to provide heated surfaces (e.g., sidewalks, driveways, etc.).

In these applications, the present inventors have recognized that it may be desirable to provide bond compatible coatings, waterproofing, electrical grounding, sound suppression and/or crack resistance to such underlayments. The present inventors have also recognized that existing flexible heating elements, which may be utilized to form a self-adhesive heated underlayment, have previously provided a number of drawbacks. For instance, such thin flexible heating elements require grounding to reduce or eliminate the potential for electrical shock. These heating elements have typically utilized a continuous metal scrim layer to provide a grounding layer that overlays the surface of the heating element. It has also been recognized that this arrangement can result in a capacitance between the typically flat electrical resistors of such heating elements (e.g., carbon bands of the heater) and the scrim layer. Periodic discharge of this capacitance can trip a ground fault circuit turning off power to the heater. To alleviate concerns about grounding, as well as providing a seal for waterproofing for such heaters, provided herein various different self-adhering membrane and heater combinations that allow for effectively grounding heaters without generating significant capacitance storage as well as providing a means for sealing an installed heater. In various aspects, the self-adhesive underlayment may also provide, inter alia, for providing crack suppression, sound deadening and/or insulation between a heating element and an underlying surface.

According to a first aspect, a system and method (i.e., utility) provides a heated underlayment that substantially reduces or eliminates concerns of capacitance build-up which may result in unintended circuit tripping. Generally, the utility includes a flexible heating element including a substantially planar body having top and bottom surfaces. Typically, such a flexible heating element includes first and second conductors and one or more resistor elements such as carbon fibers or printed carbon pathways extending there between. In the present utility, a first waterproof adhesive material layer or sheet has a top surface adhered proximate to the bottom surface of the flexible heating element. A release sheet is attached to the bottom surface of this waterproof adhesive material layer. Accordingly, removal of this release sheet exposes an adhesive surface that may be utilized to adhere the flexible heating element to an underlying surface. The utility further includes a mesh grounding layer that is attached proximate to the top surface of the flexible heating element. Such mesh grounding layer has a conductive surface area that is typically sixty percent less than the conductive surface area of a continuous solid grounding layer and thereby substantially reduces the potential for capacitance build-up between the grounding layer and the resistive heating elements of the flexible heating element.

Typically the mesh grounding layer is formed of wire mesh having a first set of wires in a weft direction and a second set of wires extending in a warp direction. Typically, to provide enough electrical conductivity to provide effective grounding, it may be desirable that the spacing density of such wires be at least ten wires per inch. More preferably such spacing density may be between about fourteen and eighteen wires per inch. In one arrangement, the spacing density is fourteen wires per inch in the first direction and at least fourteen wires per inch in a second direction. The diameter of each wire may also be a function of the electrical capacity of the heater and, hence, the necessary carrying capacity of a fault circuit. For instance, in a fourteen by fourteen per inch weave of mesh wires, a minimum diameter of 0.006 inches may be required to provide adequate grounding.

In one arrangement, textile or cloth fibers are interwoven into the wire mesh. Such textile fibers may be woven in between the wires in the warp or weft directions or both. In any arrangement, such textile fibers (e.g., yarns, threads, fabrics, etc) may provide a porous surface to which, for example, mortars or other adhesives may adhere.

In one arrangement, a second waterproof adhesive material layer or sheet is disposed on the top surface of the flexible heating element. In this arrangement, a second adhesive material layer may adhere the wire mesh to the flexible heating element. In one arrangement the wire mesh may be disposed within a matrix of the second adhesive material layer. In such an arrangement, a top surface of the adhesive material layer may be covered with a fabric or textile to provide a porous surface for adherence. In another arrangement, the top surface of the second adhesive material layer may be adhered to a wire mesh grounding layer that includes woven fabrics therein.

In one aspect, first and second adhesive layers (e.g., upper and lower membranes) may be utilized to encapsulate the heating element after the heating element is adhered to a surface. In such an arrangement, the first and second adhesive membranes disposed on opposing sides of the heater element may be wider and/or longer than the width and/or length, respectively, of the flexible heating element. Facing surfaces of the portions of the membranes that extend beyond the lateral edges or ends of the heating element may be covered with release sheets. According, by removing these release sheets these facing surfaces of the upper and lower membranes may be adhered together and thereby fully encapsulate and thereby waterproof the heating element, for instance, after the heater element has been attached to a surface and electrically connected to a power source. This arrangement may also allow for waterproofing the electrical connection to the power source.

Flexible adhesive material layers may be formed of any materials that provide desired qualities. In one arrangement, the adhesive material layer or layers are formed from non-adhesive base layers (e.g., plastic sheets) having one or more surfaces covered with an adhesive coating. In another arrangement, the adhesive material layers are themselves waterproof and adhesive. In such an arrangement, rubberized materials such as bituminous and/or elastomeric materials may be utilized. In other arrangements butyl rubbers may be utilized. In one arrangement, the thickness of at least the lower adhesive material layer is at least about 20 mils and more typically at least about 40 mils. Other thicknesses may be utilized as well. Use of these relatively thick adhesive material layers may allow for some contraction of a surface below the heating element and thereby provide crack resistance for flooring or other materials applied to the top surface of the heating element.

In a further arrangement, one or more spacer materials may be disposed below the heating element. For instance, in one arrangement an open cell or closed cell foam layer may be disposed between a floor and the heating element itself. This may provide insulation relative to a support surface (e.g., thermal and/or acoustic insulation).

In a further arrangement, a system and method (i.e., utility) is provided for waterproofing of a flexible thin film heater underlayment. Initially, a heating underlayment is provided that includes a thin film heating element. Such a heating element typically is less than about 35 or 50 mils in thickness and includes various resistors that extend between conductors. Typically, the resistors are carbon or carbonic resistors. A first adhesive member is attached relative to a bottom surface of the heating element. Typically at least a first edge of the lower adhesive waterproof member extends beyond a corresponding edge of the heater element. Likewise an upper waterproof membrane is attached relative to a top surface of the heater element and has an edge that extends beyond the corresponding edge of the heater element. The edge portions that extend beyond the heater element form sealing flaps. Accordingly, these sealing flaps may adhere together to encapsulate the heater element after the heater element is correctly positioned and/or interconnected to an electrical power source. The method may further include removing release sheets from facing surfaces of these sealing flaps. In this latter regard, correctly positioning may include removing a release sheet from a bottom surface of the lower waterproof membrane to adhere the heater to a support surface such as a floor, roof, sidewalk, etc.

In one arrangement, these first and second lateral edges of the adhesive membranes extend beyond the opposing lateral edges of the heating element. In another arrangement, the entire periphery of the heating element may be disposed within the periphery of the upper and lower membranes such that the upper and lower membranes may seal around the entire periphery of the heater.

DETAILED DESCRIPTION

Disclosed herein are various embodiments of a self-adhesive radiant heating underlayment. Although discussed primarily in relation to the use of a thin carbonic heating element and use in radiant flooring applications, it will be appreciated that various aspects of the present disclosure may be utilized in other applications (e.g., outdoor applications) and/or with different heating elements including, without limitation, electric cables and/or fluid carrying tubes.

Figure 1:
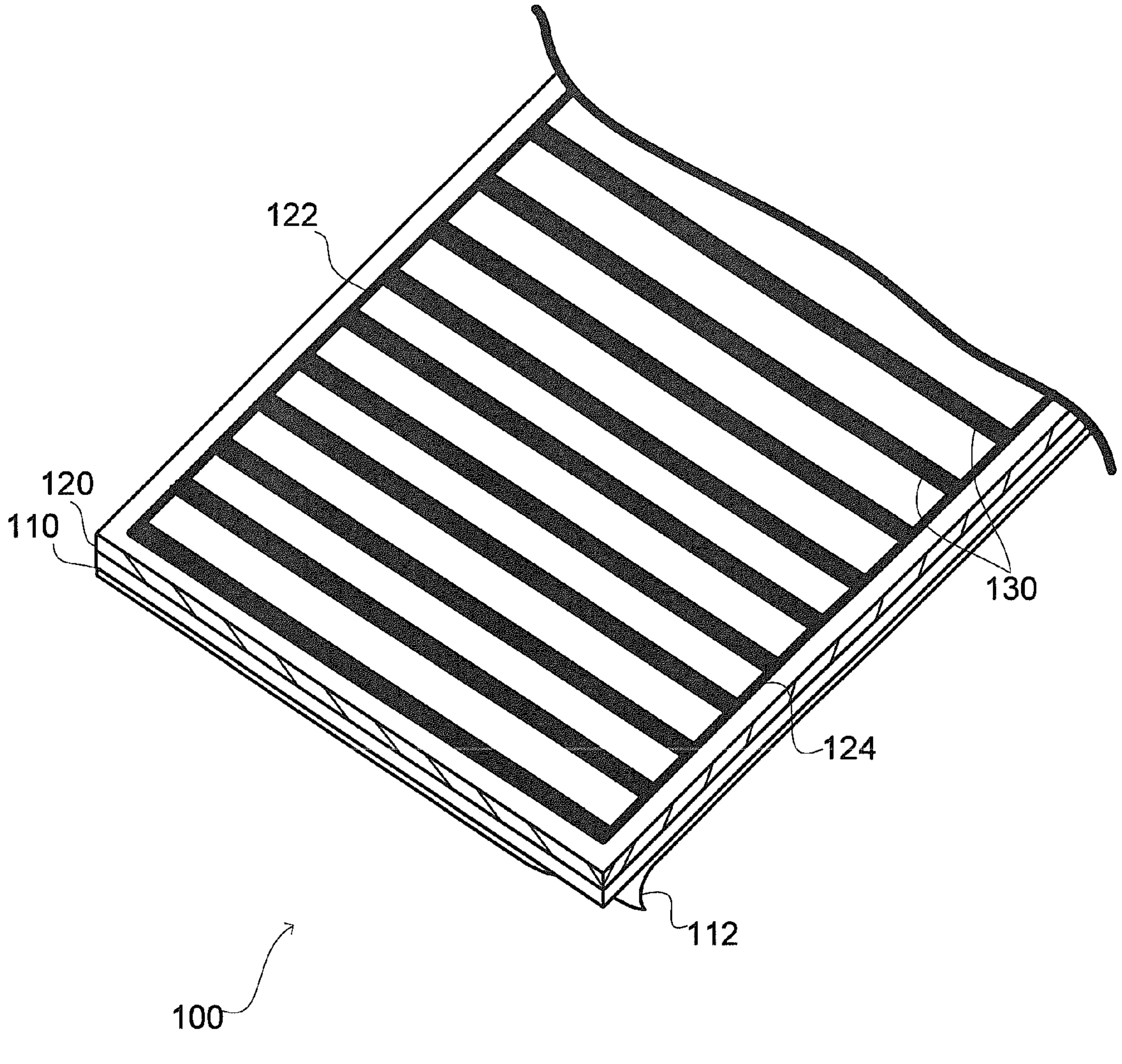
FIG. 1 illustrates one embodiment of a self-adhesive radiant heating underlayment.

FIG. 1 illustrates a first embodiment of a self-adhesive flooring underlayment 100. As shown, the flooring underlayment 100 is formed of laminated layers, which are discussed herein. The total thickness of the flooring underlayment is typically less than about 0.25 inches though other thicker and thinner underlayments are possible. In any embodiment, the flooring underlayment will include at least the following components: a heating element 120, an adhesive membrane 110 and a release sheet 112. The heating element 120 is adhered to a top surface of the adhesive membrane 110 while the release sheet 112 is releaseably interconnected to the bottom surface of the adhesive membrane 110. By removing the release sheet 112 from the bottom surface of the adhesive membrane 110, an adhesive surface is exposed for adhering the heating element in a desired location. That is, the exposed adhesive surface may be utilized to adhere the heating element to a floor, subfloor, roof, concrete surface, etc.

The adhesive membrane 110 may, in one embodiment, be constructed of a bitumen-containing material. Such a bitumen-containing material may provide both adhesive and waterproof properties allowing the adhesive membrane 110 to both adhesively attach the heating underlayment 100 to a surface and provide waterproofing for that surface. Examples of suitable materials for use in constructing the bitumen material include, without limitation, bitumen-containing materials such as various tar adhesives and rubberized asphalts, as well as certain butyl-rubber compounds. In one embodiment, an adhesive membrane is constructed from a modified, rubberized asphalt material. Such a composition has been found to provide excellent dimensional stability, pliability and adhesion under actual use conditions. However, it will be appreciated that other adhesive materials (e.g., non-bitumen) are possible and within the scope of the present invention.

The membrane may further include a reinforcing layer to improve its strength and dimensional stability. In one arrangement, the reinforcing layer is disposed within a middle portion of the adhesive membrane. In one embodiment, the reinforcing layer comprises a polyester mesh fabric sandwiched between two adhesive bitumen layers. However, it will be appreciated that the membrane may simply comprise a single bitumen-containing layer that does not utilize a reinforcing layer to provide, for example, a membrane with increased flexibility.

As noted, the self-adhesive heating underlayment 100 has a peel-away release sheet 112 that prevents undesired sticking of the adhesive membrane prior to positioning and application. Many different foils, films, papers or other sheet materials are suitable for use in constructing the release sheet 112. For example, the release sheet may comprise a metal, plastic or paper sheet treated with silicon or other substances to provide a low level of adhesion to the adhesive membrane while maintaining their peel-away qualities.

Figure 2A:
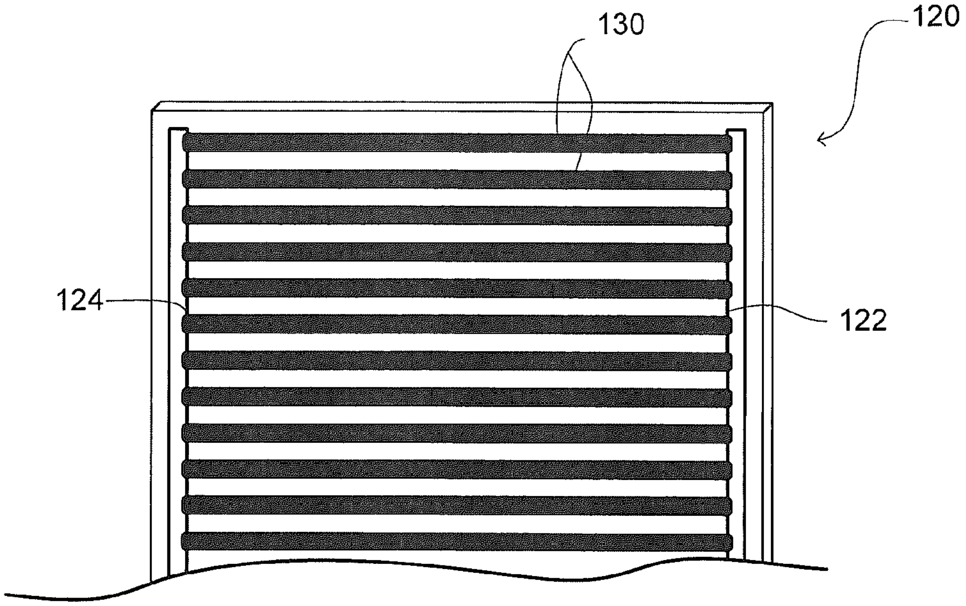
FIG. 2A illustrates one embodiment of a thin film radiant heating element.
Figure 2B:
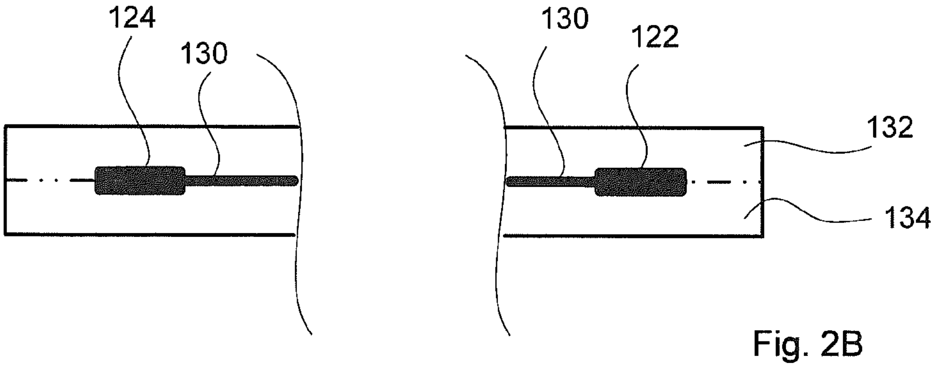
FIG. 2B illustrates a cross-sectional view of the heating element of FIG. 2A.

FIGS. 2A and 2B illustrate one embodiment of the heating element 120 that may be utilized with the present self-adhesive heating underlayment 100. As shown, the heating element is formed of a laminated sheet material (e.g., a thin film heating element). The total thickness of the illustrated heating element is approximately 15 mils thick and 36 inches wide with a length up to about 20 feet. Other thin film heating elements may have different dimensions. In any case, the application of the thin film heating element to the adhesive membrane typically results in a thin structure on top of which flooring may by applied without significantly altering the finished height of the floor.

The heating element 120 has first and second conductors bus bars 122, 124 running along opposing edges thereof. Extending between these conductors 122, 124 are plurality of flat carbon conductors 130. Each of these carbon conductors 130 effectively forms a resistor that generates heat in response to an applied voltage. The busbars 122, 124 and the carbon conductors 130 are disposed between non-conductive substrates. The upper and lower substrates 132, 134 may be heat sealed together to isolate the busbars and resistors. One such thin film heating element is commercially available from CalorIQue, Ltd of West Wareham, Mass. 02576. As shown, each of the carbon resistors 130 is spaced from its immediate adjacent neighbors. This allows for cutting the heating underlayment between adjacent rows of carbon resistors in order to trim the underlayment to a desired length. It will be appreciated that the first and second busbars may be interconnected to a voltage source and/or thermostat to provide controlled application of the electrical energy across the carbon conductors 130. Further, it will be appreciate that adjacent heating elements applied to a floor may be interconnected to a common thermostat and/or voltage source. The heating element may be utilized with 120 volt and/or 240 volt sources.

The first and second substrates are typically a polymeric material that encase and electrically isolate the bus bars and electrical resistors. Typically, such substrates are very thin on the order of about 5-7 mils. Both trimming the length of the underlayment and connecting the busbars to a power source pierces the upper and lower substrates potentially allowing for moisture infiltration to the active element components.

Such thin film heating elements utilize significant power to provide heat. For instance, some heating elements utilize 12 watts per square foot. Further, such heating elements may draw significant amperage (e.g., one amp per square foot). As will be appreciated, this level of electrical energy has the potential to provide a significant shock if the heating element were pierced to a ground. For instance, in a heated flooring underlayment, if a homeowner were to drive a nail through the heating element, there is potential that the nail could cause a ground, which may result in electric shock to the user. Accordingly, to prevent such shocks or lessen their duration, most thin film heaters utilize a grounding layer and are wired into a ground fault interruption circuit.

In such GFI circuits, an electrical wiring device disconnects a circuit whenever it detects that the electrical current is not balanced between the energized conductor and the return neutral conductor (e.g., the conductors interconnected to the bus bars of the heating element). Such an imbalance may be caused by current leakage through the body of the person who is grounded and touching an energized portion of the circuit. To prevent this, GFI circuits are designed to quickly disconnect electrical power. Such GFIs are typically intended to operate within 25-40 milliseconds. To further prevent the possibility of electrical shock, such electrical resistive elements typically include a grounding layer that is disposed over the electrical resistors. Accordingly, if a piercing element (e.g., nail) were to pierce the heating element, that piercing element must first pass through the grounding layer and then into the electrical conductors. Accordingly, in addition to being attached to a GFI circuit, current passing from the conductor through the piercing element is grounded by the grounding layer to further reduce the likelihood of accidental shock.

An aluminum scrim layer (e.g., grounding layer) has previously been placed on top of or below one of the encasing substrates of the heating element. While providing an effective grounding mechanism, it has been recognized that use of a continuous metal sheet as a grounding layer provides a significant problem. Specifically, a capacitance between the metal sheet (e.g., aluminum scrim layer) and the underlying electrical resistors can result in unintended trippage of a ground fault interruption circuit.

More specifically, it has been recognized that many thin film heating elements utilize thin, flat and relatively wide carbon or carbonic conductors that extend between the busbars. These conductors often make up all or most of the surface between the busbars. In this regard, the conductors effectively form a first plate, and the metal scrim layer forms a second plate separated by the substrate film that encases the conductors. When the electrical conductors are charged, such a system effectively defines a parallel plate capacitor. As will be appreciated, in a parallel plate capacitor, capacitance held by the capacitor is directly proportional to the surface area of the conductor plates and inversely proportional to the separation distance between the plates. As may be appreciated, if the heating element and the aluminum scrim layer are 2-3 feet wide and 2-3 feet long, or larger, and only separated by a 5 mil nonconductive substrate, the heating element has the potential to hold a significant capacitance. Furthermore, such a capacitance may periodically discharge.

It has been determined that a discharge of the capacitance stored between the continuous aluminum scrim layer and the substantially continuous resistance element may be enough to trip a ground fault interruption circuit. In this regard, electrical power to the heating element and/or any heating elements disposed in parallel and/or in series with this heating element is terminated. Accordingly, until the ground fault interruption circuit is reset, no heating is provided.

To reduce the likelihood of unintentional tripping of the heating element, it has been recognized that a conductive mesh may be utilized instead of a continuous grounding layer. In this regard, such a mesh reduces the surface area of the grounding layer. As capacitance is directly proportional to the surface area of the conductor plates, the ability of the resulting system to hold a capacitance is significantly reduced. Accordingly, unintended ground fault interruption may be averted. However, while reducing the likelihood of capacitance buildup, it is necessary that the wire mesh have the capacity to carry enough electrical current to trip a ground fault interruption in instances where the heating element is punctured. For instance, if 14-guage wires are utilized to energize the bus bars of the heating element, the wire mesh has to have the ability to carry the voltage of the primary input received in a 14-guage wire. For most applications, it has been determined that a 14×18 mesh of wires having a 0.006 diameter are operative in 120 volt system to trip a ground fault interruption circuit if an object punctures the heating element.

Figure 3:
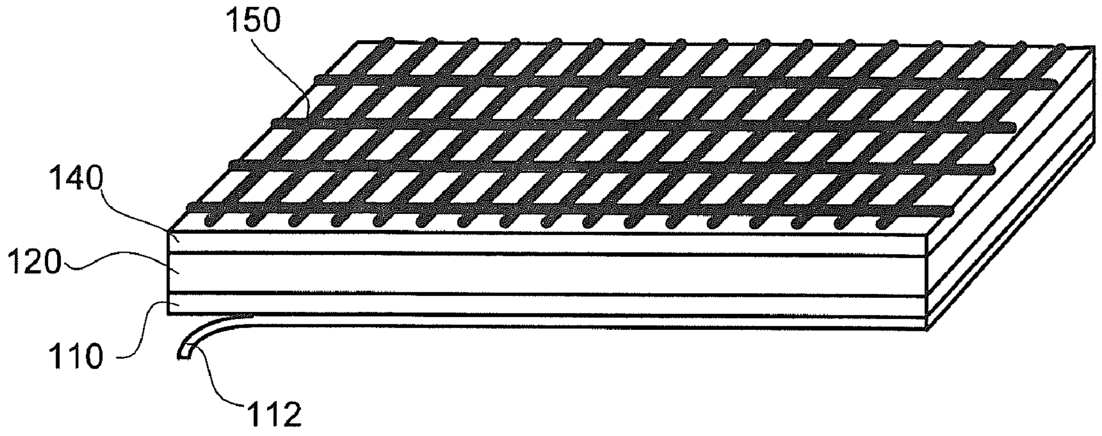
FIG. 3 illustrates another embodiment of a self-adhesive radiant heating underlayment with a mesh screen grounding layer.

In order to interconnect a wire mesh screen to the heating element, the present system utilizes a second adhesive membrane 140 (See FIG. 3). As shown, the second adhesive membrane 140 is adhered to the top surface of the heating element 120. In this regard, a bottom surface of the second membrane 140 is adhered to the top surface of the heating element. In the embodiment illustrated in FIG. 3, a wire mesh 150 is adhered to the top surface of the membrane 140. When the resulting underlayment is wired to an electrical circuit, first and second conductors are interconnected to the first and second busbars and a ground conductor is interconnected to the wire mesh 150.

Figure 4:
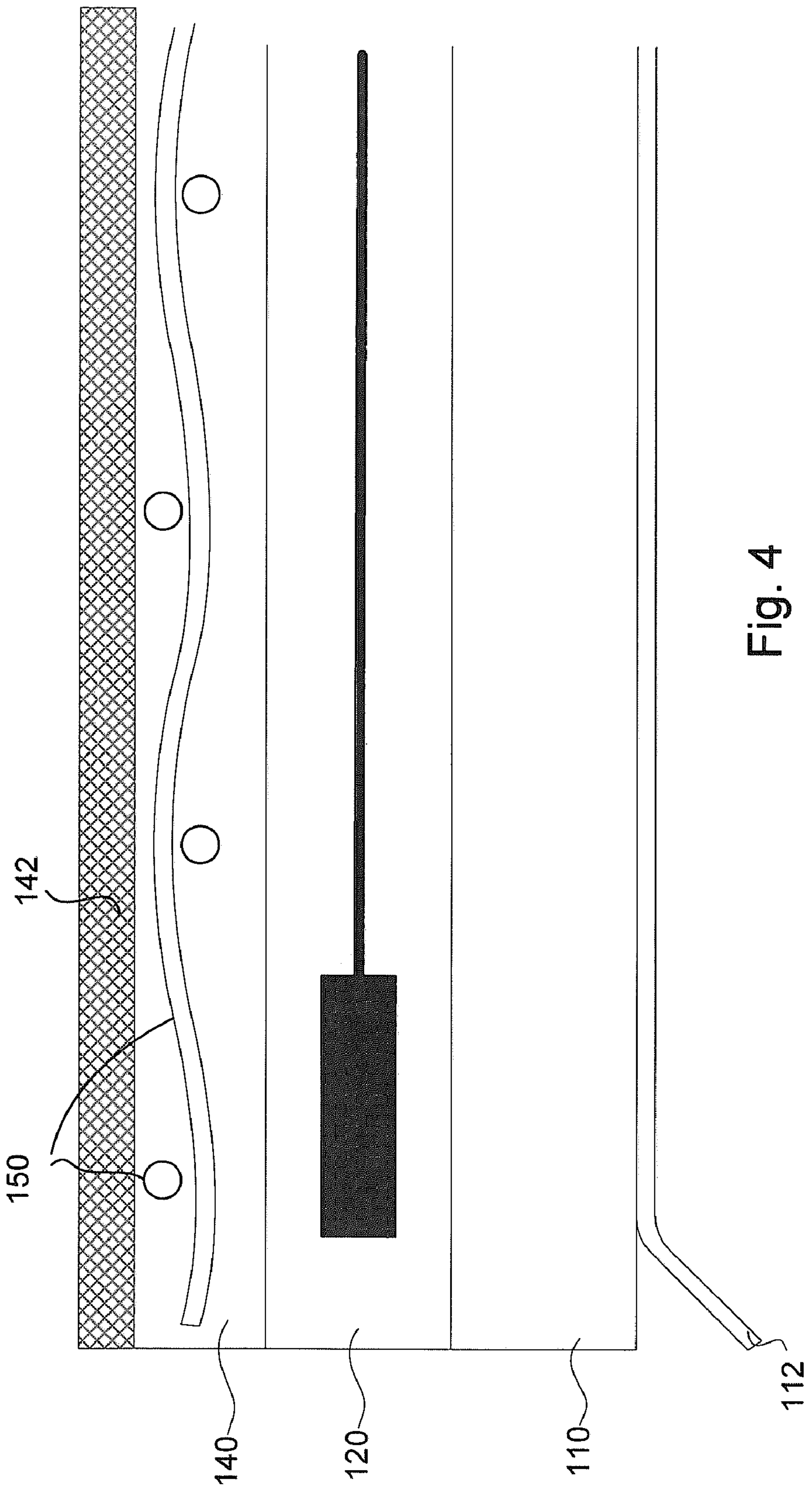
FIG. 4 illustrates another embodiment of a self-adhesive radiant heating underlayment where a mesh screen is disposed within a waterproof membrane.

FIG. 4 illustrates an alternate embodiment where a second adhesive membrane 140 is utilized to interconnect a grounding mesh layer 150 to the heating element 120. However, in this embodiment, the wire mesh is disposed within the matrix of the second membrane 140. That is, during the process of forming the membrane 140, the wire mesh 150 is inserted within the adhesive membrane material. In such an arrangement, the top surface of the second membrane 140 may then be utilized as, for example, an adhesive surface. In this regard, the top surface may be covered with a peel-away release sheet. However, it has been further recognized that, in many underlayment applications, it may be desirable to, for example, to lay tile over the heated underlayment. This may require adhering a thin set mortar to the top surface of the underlayment. Typically, waterproofing membranes have a smooth non-porous surface that provides poor adherence to bonding materials such as mortars. Accordingly, a fabric or other textile material may be adhered to the top surface of the membrane 140 in order to provide an improved surface for bond compatibility. It will be appreciated that most fabrics do bond well to such adhesive membranes and that, in turn, most fabrics provide a porous surface into which a thin set mortar or other bonding agent can adhere. Accordingly, in most applications, it may be desirable to have a textile or fabric upper surface 142 to improve adherence with overlying materials.

Figure 5:
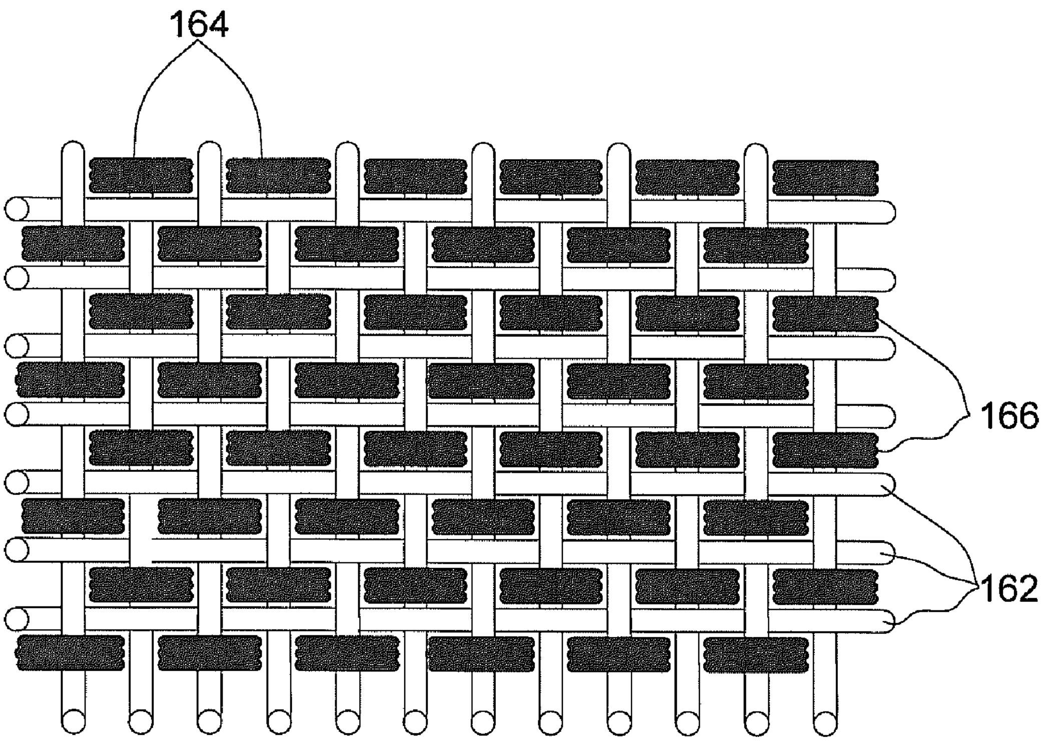
FIG. 5 illustrates a composite screen mesh where fabric is interwoven with metal wires.

A further embodiment similar to FIG. 3 uses a composite weave 160 with a heated underlayment having a lower adhesive membrane 110, heating element 120 and upper adhesive membrane 140. In order to provide bonding capabilities and electrical grounding capabilities, such an embodiment (not illustrated) utilizes a composite mesh and fabric weave 160. This composite weave 160 is adhered to the top surface of the upper membrane 140. As illustrated in FIG. 5, the composite weave is formed of a mesh weave having electrically conductive wires extending in both the warp and weft directions. As discussed above, density of the wires may accommodate a desired electrical load. For instance, there may be 14 wires in the weave direction and 18 wires in the weft direction. However, it will be appreciated that other embodiments are possible. Disposed between the weft wires 162 is a textile fabric 166. That is, textile fabric is interwoven with the wires 162, 164. In this regard, the resulting structure may have textile strands of yarns disposed between each row of weft and/or warp wires. This allows the weave 160 to provide both a bonding surface for overlying materials as well as providing grounding for the electrical element 120. It will be further appreciated that various different fabrics may be utilized to produce such a composite weave. A non-limiting list of such fabrics includes nylon, polypropylene and cotton. Further, incorporation of the fabric into the grounding layer reduces the number of layers that must be laminated together to produce the heated underlayment.

As discussed above, the electrical buses and carbon resistors are typically disposed between first and second nonconductive substrates or films 132, 134. Typically, these substrates provide some waterproofing for the heater element 120. However, when the heater element is connected to an electrical source and/or the heater element is trimmed (e.g., between the electrical resistors), at least a portion of the buses are exposed. This may be problematic if the underlayment is utilized in a wet application. For instance, if the underlayment is utilized in a shower or as a roofing underlayment, the underlayment may periodically come into contact with water. While most applications provide some overlying waterproofing (e.g., tile, linoleum flooring, etc.), the exposure of the buses when interconnecting the heater element to a power source or an adjacent heater element provides a potential location for an electrical short.

Figure 6:
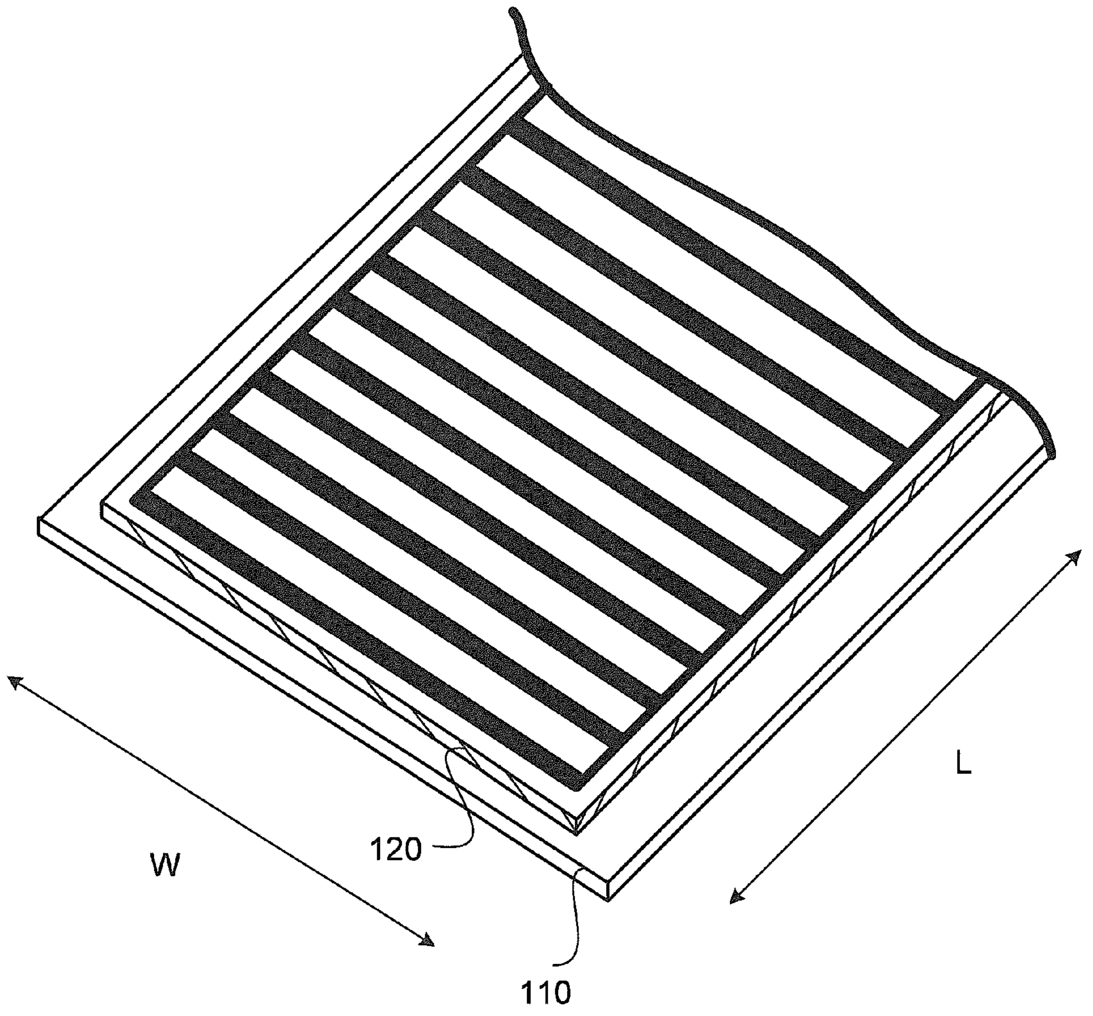
FIG. 6 illustrates a further embodiment of a self-adhesive radiant heating underlayment that allows for sealing the heating element within waterproof membranes after application.

To further reduce the likelihood of such exposed buses from shorting, one embodiment of the underlayment utilizes the upper and lower membranes 110, 140 to seal the heating element after the heating element has been trimmed and/or interconnected to an electrical source or adjacent heating element. As illustrated in FIG. 6, the heating element is generally an elongated element having a width of between, for example, 2-3 feet and a length of between about 3-5 feet. Other dimensions are possible. Accordingly, the heating element may be placed on a lower membrane 110 that has a width and/or length that is greater than the width and/or length of the heating element 120. Likewise, an upper membrane (not shown) may be applied to the top surface of the heating element that again has a length and/or width that is greater than that of the heating element. In this regard, the membranes may extend beyond some or all the edges of the heater element 120.

Figure 7A:
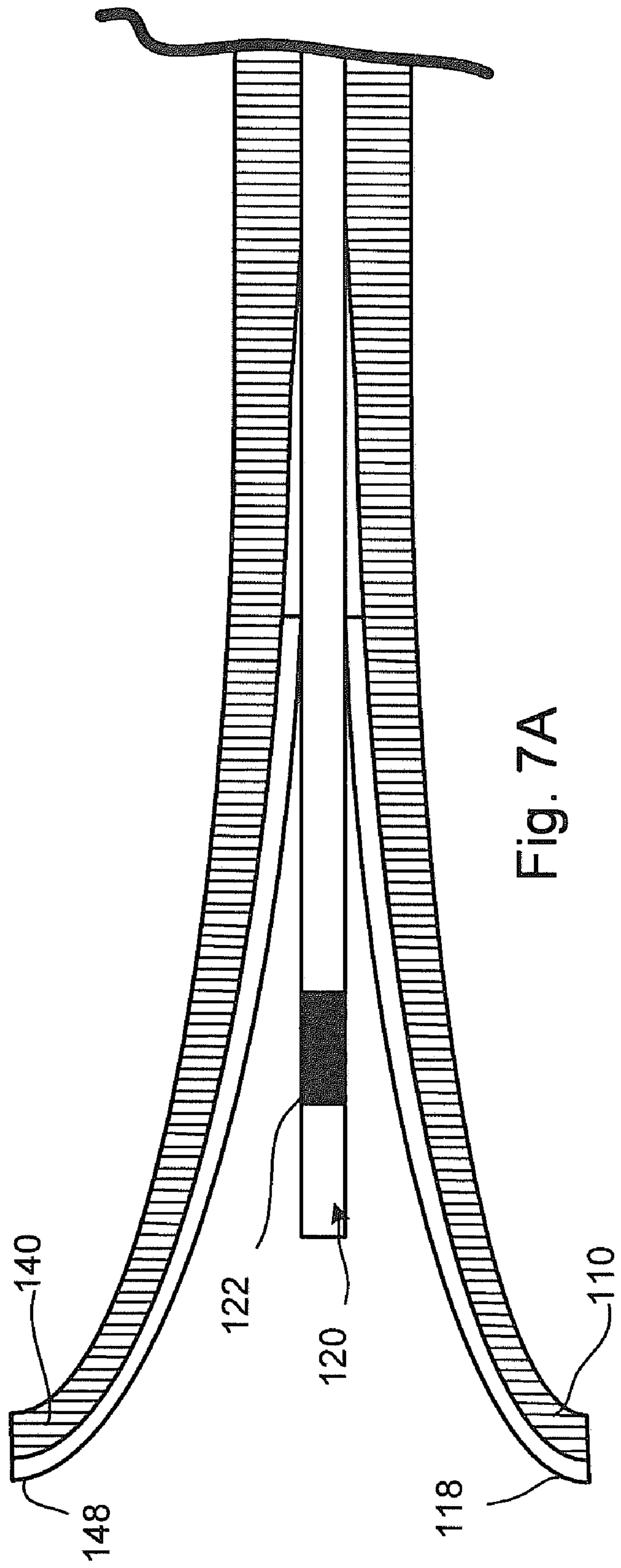
FIGS. 7A and 7B illustrate sealing a heating element between opposing waterproof membranes.
Figure 7B:
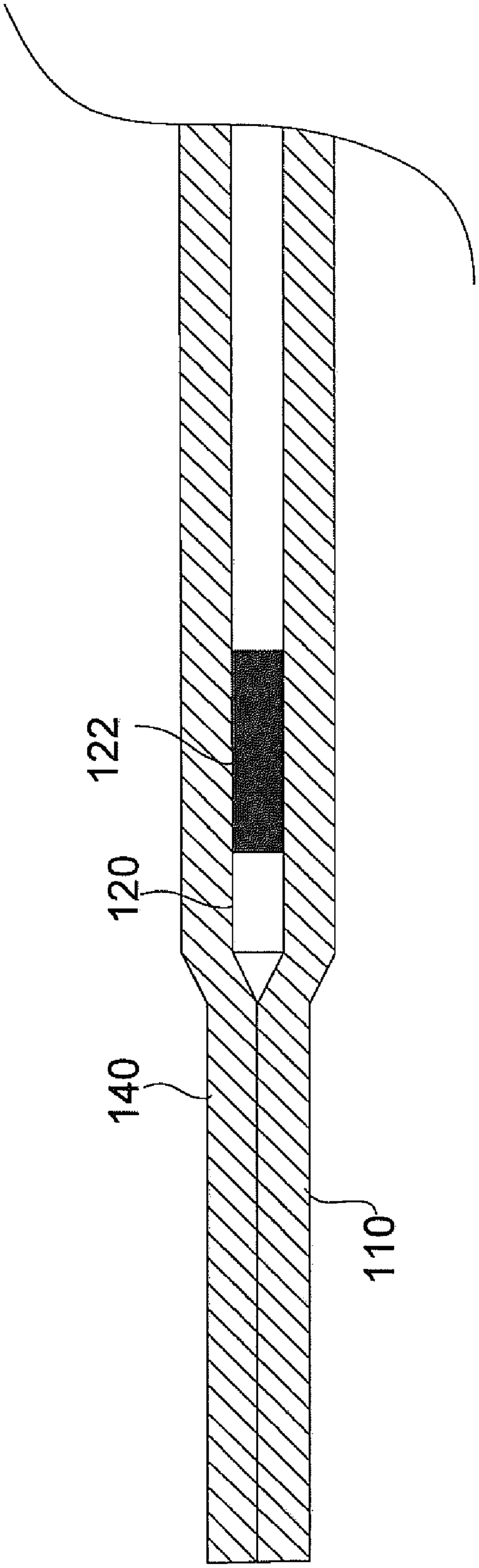

FIGS. 7A-7B illustrate the heater element 120 being disposed between a lower membrane 110 and an upper membrane 140 which both extend beyond an edge of the heater element. As shown, the lower and upper membrane 110, 140, respectively, each include a peel-away release sheet 118, 148 on their facing surfaces. As will be appreciated, these release sheets 118, 148 prevent the upper and lower membranes from adhering together during application of the underlayment to a desired surface. Once the bottom surface of the lower membrane 110 is adhered to a surface and the bus 122 is interconnected to an electrical source and/or an adjacent heater element, these facing release sheets 118, 148 may be removed from the upper and lower membranes 110, 140. These membranes may be adhered together as illustrated in FIG. 7B. It will be appreciated that when utilizing bituminous membrane materials, the adherence of these materials together may form a cohesive bond. That is, once these membranes 110, 140 are adhered together they form a single cohesive structure. In any case, the resulting structure is waterproof and provides waterproofing isolation for the fully encased heater element 120. In this regard, any interconnections of the heater element 120 to adjacent heating elements and/or power sources may be sealed within the underlayment via the waterproof membranes 110, 140.

As will be appreciated, the ability to seal the heating element into the membranes after electrically connecting the heating element provides an additional layer of safety against shorts for the system. In this regard, such an underlayment may be utilized in numerous wet applications. Such applications include use of showers as well as outdoor applications.

Use of the heating element 120 with the adhesive membrane 110 allows for producing a thin flexible heating underlayment 100 that may be stored in a roll prior to application. Further, the adhesive surface of the membrane conveniently holds the heating element in place prior to application of flooring material to the top surface of the heating element 120. However, the release sheet prevents the heating element from adhering to a surface prior to being correctly positioned. For instance, while the release sheet is in place, the underlayment may be unrolled and locating in a desired position. Once located, the release sheet may be pulled back on itself to expose the adhesive membrane, which may adhere to the underlying surface.

In one embodiment, the adhesive membrane allows for structural movement and/or shrinkage of an underlying floor (e.g., concrete). That is, the adhesive membrane 110 provides a crack suppressing underlayment for materials (e.g., tile) disposed over the heating element. In such an arrangement, when tile is adhered to the top surface of the heating element, the adhesive membrane is disposed between the heating element and the underlying floor or subfloor. The adhesive membrane may allow for limited movement therebetween such that expansion and/or shrinkage of the floor/subfloor does not result in cracking of underlying tiles and/or mortar there between. In such an embodiment, the adhesive membrane provides a backing that allows the heating element and supported flooring/tiles limited float above the floor/subfloor.

In a further arrangement, the lower adhesive membrane may have a width that is greater than the width of the heating element and/or an upper membrane. In this regard, adjacent underlayments may be lapped. When utilizing the modified rubberized asphalt discussed above, this may allow for creating a cohesive bond between adjacent underlayments. That is, such underlayment maybe a joined to form a unitary membrane over a surface.

Another significant benefit of utilizing the waterproof membranes of the present invention is that waterproofing is provided for the heater element and an underlying surface. In this regard, it will be noted that the self-adhesive heating underlayment may be utilized in wet applications (e.g., countertops, showers, etc.). Further, such waterproofing capabilities allow use of the heated underlayment in applications other than flooring. Specifically, the waterproofing capabilities allow use of the heated underlayment in a number of outdoor applications. One such application is use of the heating underlayment as a roofing membrane. In such an application, the heating underlayment may be utilized as an ice and water shield that not only waterproofs a roof but also provides a means for heating the roof to remove ice and/or snow therefrom. Other outdoor uses for the heating underlayment include, without limitation, use in heated sidewalk and/or heated driveway applications. A further outdoor use includes use in roadway construction (e.g., bridge dock heating) and/or foundation construction applications. In the latter regard, the underlayment may be utilized to waterproof and heat the foundation of buildings. In the former regard, the underlayment may be utilized on highway overpasses that are prone to ice buildup in winter conditions.

Due to nature of the carbon fibers that provide resistive heat, the heating underlayment may be utilized with various different power sources. For instance, the heating underlayment may be utilized with low voltage direct power sources such as may be available from solar-voltaic sources. This may allow using the heating underlayment in remove locations that do not have ready access to a power grid.

Figure 8:
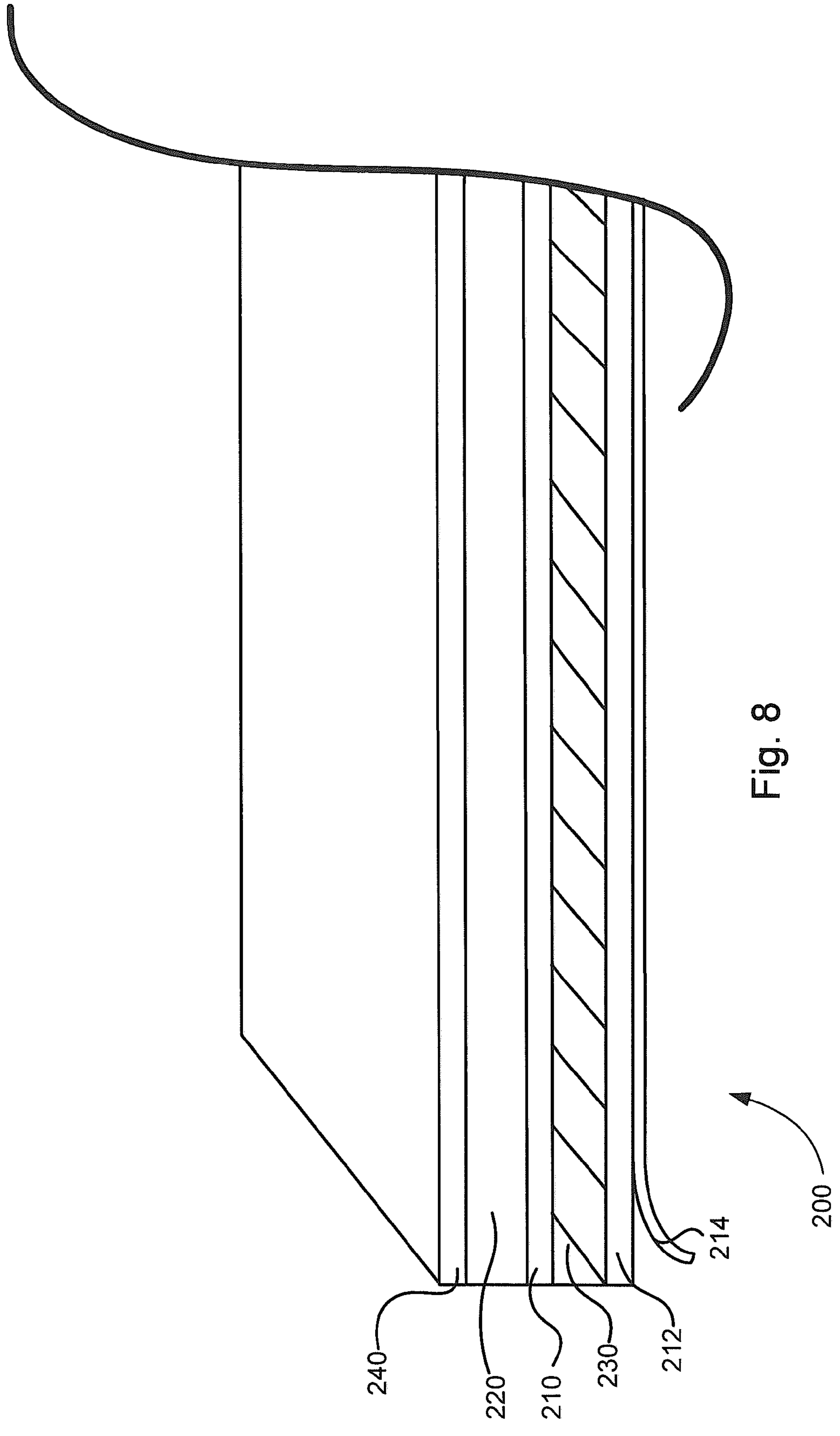
FIG. 8 illustrates a self-adhesive radiant heating underlayment that incorporates a insulation layer.

It will be appreciated that in various applications it may be desirable to provide additional material layers to the heating underlayment. FIG. 8 illustrates a further embodiment of a self-adhesive hearting underlayment 200 that includes one or more additional material layers. As shown, the heating underlayment 200 includes a heating element 220, a first lower adhesive membrane 210, a spacer material 230, a second lower adhesive membrane 212 and a release liner 214. In this arrangement, the first adhesive membrane 210 interconnects the heating element 220 to the top of the spacer material 230 and the second adhesive membrane 212 is used to interconnect the assembly to a surface. An optional top membrane 240 may attach fabrics/textiles or grounding layers to the underlayment 200.

The spacer material 230 may be selected based on desired properties for the resulting underlayment. For instance, it will be noted that in flooring applications that utilize tile and/or hardwoods, living spaces beneath such floors may be subject to transmitted or impact sounds. Accordingly, the spacer material may be formed of a foam or other low density material that has desired acoustic properties. In one application, such a foam may be formed of a cross-linked poly-olefin foam, which has been identified as providing good acoustic absorption.

In other arrangements, it may be desirable that the spacer material provide thermal insulation between the heating element and the underlying surface/floor. That is, in some applications, it may be desirable to prevent heat from being absorbed through the floor. That is, an insulation layer may limit conductive heat losses into the floor and thereby direct heat into a living structure. In such an arrangement, the spacer material may be made of, for example, a closed cell polyethylene foam. Based on the desired and insulative properties, the spacer thickness may range between ¼ inch and 1.5 inches. Other thicknesses and insulative materials are possible as well.

The foregoing description has been presented for purposes of illustration and description. Furthermore, the description is not intended to limit the disclosed apparatuses and method to the forms disclosed herein. Consequently, variations and modifications commensurate with the above teachings, and skill and knowledge of the relevant art, are within the scope of the presented inventions. The embodiments described hereinabove are further intended to explain best modes known of practicing the invention and to enable others skilled in the art to utilize the invention in such, or other embodiments and with various modifications required by the particular application(s) or use(s) of the presented inventions. It is intended that the appended claims be construed to include alternative embodiments to the extent permitted by the prior art.

What is claimed:

1. A self-adhesive heating underlayment comprising:

a flexible heating element including substantially planar body having top and bottom surfaces, said flexible heating element having first and second conductors and at least one resistive heating element extending there between;

a first waterproof adhesive material layer having a top surface adhered proximate to said bottom surface of said flexible heating element;

a release sheet releaseably attached to a bottom surface of the first waterproof adhesive material layer; and a mesh grounding layer attached proximate to the top surface of the flexible heating element.

2. The apparatus of claim 1, wherein said mesh grounding layer comprises a wire mesh grounding layer.

3. The apparatus of claim 2, wherein said mesh grounding layer comprises:

textile fibers interwoven with wires that define the wire mesh grounding layer.

4. The apparatus of claim 2, further comprising:

a second waterproof adhesive material layer at least partially disposed between said wire mesh grounding layer and said top surface of said flexible heating element.

5. The apparatus of claim 4, wherein said second waterproof adhesive material layer has a bottom surface adhered to said top surface of said flexible heating element.

6. The apparatus of claim 4, wherein said wire mesh grounding layer is disposed within said second waterproof adhesive material layer.

7. The apparatus of claim 4, further comprising:

a textile layer adhered to a top surface of said second waterproof adhesive material layer.

8. The apparatus of claim 4, wherein said flexible heating element has a lateral width that is less than corresponding lateral widths of said first and second waterproof adhesive membrane layers.

9. The apparatus of claim 8, wherein:

a portion of the first adhesive membrane extends beyond a lateral edge of the flexible heating element defining a lower sealing flap; and a portion of the second adhesive membrane extends beyond a lateral edge of the flexible heating element defining an upper sealing flap.

10. The apparatus of claim 8, wherein:

an upper surface of said lower sealing flap further comprises a release sheet that releasably covers an adhesive surface; and a lower surface of said upper sealing flap further comprises a release sheet that releasably covers an adhesive surface.

11. The apparatus of claim 1, wherein said wire mesh grounding layer comprises:

a first set of wires in disposed in a first direction; and a second set of wires disposed in a second direction, wherein said first and second set of wires have a spacing density of at least 14 wires per inch and a diameter of at least 0.006 in.

12. The apparatus of claim 1, further comprising:

a spacer material layer disposed between a top surface of said first waterproof adhesive membrane and said bottom surface of said heating element.

13. The apparatus of claim 12, wherein said spacer material layer comprises at least one of an open celled foam and a closed cell foam.

14. The apparatus of claim 1, wherein said first waterproof adhesive material layer is at least 30 mils thick.

15. The apparatus of claim 1, wherein said first waterproof adhesive material layer comprises:

a flexible base layer having and adhesive applied on at least one of a top surface and a bottom surface.

16. The apparatus of claim 1, wherein said first waterproof adhesive material layer comprises:

a bitumen containing material.

17. The apparatus of claim 1, wherein said conductors and resistive heating element are disposed between top and bottom flexible substrate layers.

18. A self-adhesive heating underlayment comprising:

a flexible heating element including substantially planar body having top and bottom surfaces;

a lower waterproof membrane having a top surface attached to said bottom surface of said flexible heating element wherein at least a first lateral edge of said lower waterproof membrane extends beyond a corresponding edge of the flexible heating element defining a first sealing flap;

a first release sheet releaseably attached to a top surface of the lower sealing flap, wherein said first release sheet covers an adhesive surface of said lower sealing flap;

an upper waterproof membrane having bottom surface attached to a top surface of the flexible heating element wherein at least a first lateral edge of said upper waterproof membrane extends beyond the corresponding edge of the flexible heating element defining a upper sealing flap; and a second release sheet releaseably attached to a bottom surface of the upper sealing flap, wherein said second release sheet covers an adhesive surface of said upper sealing flap.

19. The apparatus of claim 18, further comprising a bottom release sheet releaseably attached to a bottom surface of the lower waterproof membrane, wherein the bottom release sheet covers an adhesive surface of the lower waterproof membrane.

20. The apparatus of claim 18, further comprising a mesh wire grounding layer.

21. The apparatus of claim 20, wherein the mesh wire grounding layer is one of:

at least partially disposed within said upper waterproof membrane; and disposed on a top surface of said upper waterproof membrane.

22. The apparatus of claim 20, wherein the mesh grounding layer is disposed on the top surface of the upper waterproof membrane and further comprises:

textile fibers interwoven with wires that define the wire mesh grounding layer.

23. The apparatus of claim 18, wherein said upper and lower sealing flaps extend along the length of at least one lateral edge of said flexible heating element.

24. The apparatus of claim 18, wherein said upper and lower sealing flaps each comprise first and second sealing flaps that extend along the length of first and second lateral edges of the flexible heating element.

25. The apparatus of claim 18, wherein said upper and lower sealing flaps extend about a periphery of the flexible heating element.

* * * * *